United States Patent
Kelley et al.

(10) Patent No.: US 7,325,829 B2
(45) Date of Patent: *Feb. 5, 2008

(54) AIRBAG INFLATOR

(75) Inventors: Michael E. Kelley, Valrico, FL (US); Richard M. Townsend, St. Petersburg, FL (US); Michael F. Mulville, Bartow, FL (US); Anthony J. Curtis, Palm Harbor, FL (US); Samir Heric, Wiesbaden (DE); Marko Morhard, Mainaschaff (DE); Axel Josef Wehrwein, Roβdor (DE); Guido Klettenheimer, Kelsterbach (DE)

(73) Assignee: Key Safety Systems, Inc., Sterling Heights, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/467,618

(22) Filed: Aug. 28, 2006

(65) Prior Publication Data

US 2007/0075536 A1  Apr. 5, 2007

Related U.S. Application Data

(63) Continuation-in-part of application No. 11/241,222, filed on Oct. 3, 2005.

(51) Int. Cl.
*B60R 21/26* (2006.01)
(52) U.S. Cl. ...................... 280/736; 280/737
(58) Field of Classification Search ................ 280/741, 280/742, 737, 736; 102/530, 531
See application file for complete search history.

(56) References Cited

U.S. PATENT DOCUMENTS

| 5,031,932 | A | | 7/1991 | Frantom et al. | |
|---|---|---|---|---|---|
| 5,630,619 | A | * | 5/1997 | Buchanan et al. | 280/741 |
| 5,660,412 | A | | 8/1997 | Renfroe et al. | |
| 5,664,802 | A | | 9/1997 | Harris et al. | |
| 5,692,776 | A | | 12/1997 | Rink et al. | |
| 6,039,347 | A | | 3/2000 | Maynard | |
| 6,142,514 | A | * | 11/2000 | Yamato et al. | 280/736 |

(Continued)

FOREIGN PATENT DOCUMENTS

DE    4041049 A1    7/1992

(Continued)

*Primary Examiner*—Paul N. Dickson
*Assistant Examiner*—Drew J. Brown
(74) *Attorney, Agent, or Firm*—Lonnie Drayer

(57) ABSTRACT

An airbag inflator (200, 300) for inflating an airbag has a tubular inflator housing (11) having a first end (A) and a second end (B). A gas release mechanism (80) has an exhaust port end or housing (85) at the first end (A) for releasing gas directly from the tubular inflator housing (11) to ambient air, bypassing the airbag. A heater assembly (2) containing a gas generant is located and attached at the second end (B). An igniter (3) ignites the heater assembly (2). A primary gas vent port (70) vents gas from the tubular inflator housing (11) into an airbag during normal deployment of the airbag. The gas release mechanism (80) has a passageway or opening (84) for exhausting gas from the tubular inflator housing (11) to an exhaust port (85). A seal (82, 83) seals the passageway or opening (84) of the gas release mechanism (80). An igniter 3 for opens the seal (82, 83) thereby terminating or slowing deployment and normal inflation of the airbag through the primary vent port (70).

16 Claims, 11 Drawing Sheets

U.S. PATENT DOCUMENTS

| | | |
|---|---|---|
| 6,176,518 B1 | 1/2001 | Faigle |
| 6,237,950 B1 | 5/2001 | Cook et al. |
| 6,253,683 B1 | 7/2001 | Fukabori |
| 6,488,310 B1 | 12/2002 | Ryobo et al. |
| 6,572,143 B2 * | 6/2003 | Yamato et al. ............... 280/741 |
| 6,793,244 B1 | 9/2004 | Katsuda et al. |
| 6,971,671 B2 | 12/2005 | Schneider et al. |
| 6,976,704 B2 * | 12/2005 | Lewis et al. ................. 280/741 |
| 7,246,819 B2 * | 7/2007 | Hofmann et al. ........... 280/739 |
| 2003/0001370 A1 | 1/2003 | Ryobo et al. |
| 2004/0100079 A1 | 5/2004 | Yamazaki et al. |
| 2004/0155442 A1 | 8/2004 | Ford et al. |
| 2007/0138776 A1 * | 6/2007 | Rossbach et al. ........... 280/737 |

FOREIGN PATENT DOCUMENTS

| | | |
|---|---|---|
| DE | 10130311 A1 | 2/2002 |
| DE | 10155858 A1 | 6/2002 |
| DE | 10251483 A1 | 5/2004 |
| EP | 0790157 A2 | 8/1997 |
| EP | 1323595 A2 | 7/2003 |
| EP | 1359066 A | 11/2003 |
| EP | 1405775 A1 | 9/2006 |

* cited by examiner

AIRBAG INFLATOR

RELATED APPLICATION

This application claims the benefit of priority to and is a Continuation-in-Part of application Ser. No. 11/241,222 filed Oct. 3, 2005 entitled "Hybrid Inflator".

FIELD OF THE INVENTION

This invention relates to a hybrid airbag inflator.

BACKGROUND OF THE INVENTION

Hybrid type inflators used for inflating airbags contain an inert gas in a chamber. The inert gas is heated by a burning a pyrotechnic composition within a heater structure in the inflator. The pyrotechnic composition is ignited by an igniter to initiate a rapid burning of a gas generant in a heater system. The gas generant heats the inert gas such that sufficient pressure can be achieved prior to releasing inflation gas to an airbag to inflate the airbag.

U.S. Pat. No. 5,660,412 A discloses a hybrid inflator that uses of a primary heater and a bypass heater to achieve more rapid heating of the pressurized fluid in the cylindrical gas generator. U.S. Pat. No. 5,660,412 A teaches a first pyrotechnic composition as a primary source of heating and a second pyrotechnic composition having a faster rate of gas generation wherein portions of these products of combustion directly heat the inflation gas using a single initiator.

More typically multi stage hybrid inflators utilize two igniters or initiators to separately ignite two separate gas generants or pyrotechnic compositions. Hybrid inflators of this type are disclosed in US 2004/0100079 A1, U.S. Pat. No. 6,793,244 B1, US 2003/0001370 A1 and U.S. Pat. No. 6,488,310 B1. In each of these publications the gas generant is contained in a heater element that can be activated in multiple stages by using two separate igniters. The sequences of firing are made possible by time delay such that when one activates the initiators they can be activated singularly or in parallel or sequentially.

The use of two separate heaters in opposite ends of the cylindrical inflator with the central exhaust has been taught in U.S. Pat. No. 6,253,683 B1 and EP 1 405 775 A1. These early prior art cylindrical inflators with a central exhaust did not employ bypass enhancer heaters to pre-heat the inert gas.

In the event these inflators were activated and an out of position occupant was detected, a means to bypass the inflation of the airbag to slow or stop the deployment of the airbag is desirable. To provide such a bypass feature mechanisms such as openings or hinged doors in the airbag module housing have been utilized as is shown and discussed in U.S. Pat. No. 6,971,671 B2 entitled "Active Venting Apparatus and Method For Airbag Systems". In that prior art patent a pyrotechnic composition is attached to a membrane on either the housing or the airbag to rapidly create a large vent opening or exit port to allow inflation gasses to escape from the cushion. All of these systems required additional wires, initiators and components to be added to the housing module or airbag increasing the complexity and the cost of the device.

It is therefore desirable to achieve this rapid venting capability in a more efficient, far less complex manner and clearly in a more reliable fashion.

SUMMARY OF THE INVENTION

There is provided in accordance with the present invention an airbag inflator comprising: a tubular inflator housing having a first end and a second end; a primary gas vent port that is spaced apart from both ends of the tubular inflator housing for venting gas from the tubular inflator housing into an airbag; and a gas release mechanism having an exhaust port at the first end of the tubular inflator housing for releasing gas directly from the tubular inflator housing to ambient air, bypassing the airbag.

DETAILED DESCRIPTION OF THE INVENTION

Figure 1:
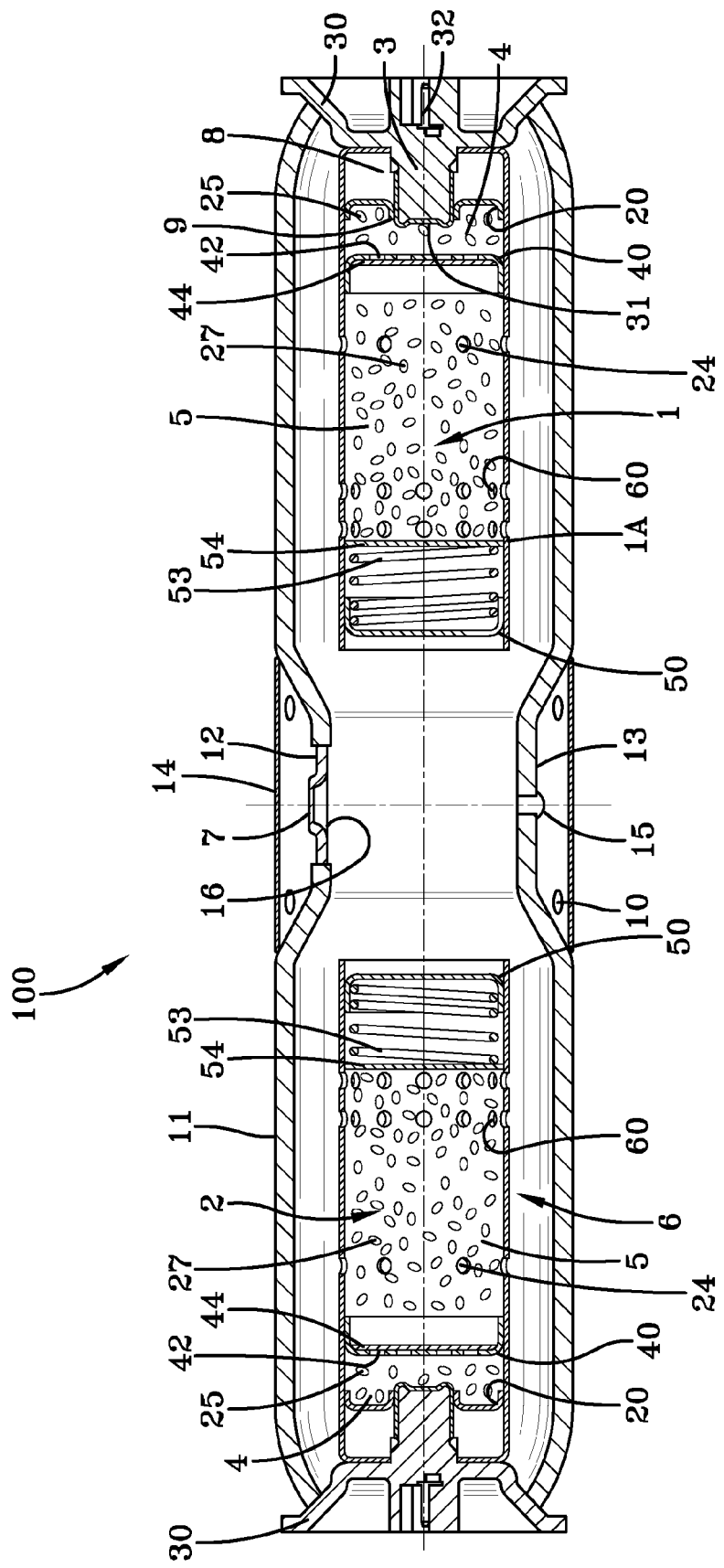
FIG. 1 is a longitudinal cross section of a hybrid airbag inflator having a gas heater located at each end of the tubular inflator housing.

FIG. 1 is a longitudinal cross section of a dual stage hybrid airbag inflator 100. The inflator 100 contains a primary stage heater assembly 1 and a second stage heater assembly 2. Either one or both heater assemblies 1, 2 can utilize the high bypass ignition concept of the present invention. Typical inflators function by actuating an igniter to ignite an ignition enhancer composition. The hot gases and particulates that are produced by the burning ignition enhancer composition ignite the gas generant in the heater that generates hot gases that in turn heats the stored gas. The stored gas is preferably an inert gas. Once a sufficient pressure is reached the outlet burst disk ruptures when internal pressure exceeds the disk failure pressure. A high bypass heater assembly employed in a hybrid airbag inflator of the present invention improves the time required to burst the outlet disk 7 by using a portion of the enhancing material to pre-heat the inert gas 6.

With reference to FIGS. 1-4 when actuated the igniter 3 ignites the ignition enhancer composition 25 in the enhancer combustion chamber 4. The hot gases and particulates produced by burning the ignition enhancer composition in the enhancer combustion chamber ignite the gas generant 27 located in the gas generant combustion chamber 5. A portion of the hot gases produced by burning the ignition enhancer composition 25 enter the inert gas storage chamber mixing with stored inert gas 6 directly through bypass openings 24 thereby heating the stored inert gas 6. The bypass openings 24 are sized and positioned to promote the flow of the hot gases produced by introduce the hot particles and gas produced by burning the ignition enhancer composition 25 into the stored inert gas 6. The bypass openings 24 may be positioned at any location along the generant tube 1A, 1B, 1C to control the relative amount of hot gases produced by burning the ignition enhancer composition 25 that bypass the gas generant 27 to that used for igniting the gas generant 27.

As shown the tubular inflator housing 11 is configured to allow attachment of the primary stage heater 1 and the secondary stage heater 2 at opposite ends of the tubular inflator housing 11. A gas outlet burst disk 7 is attached to a washer shaped carrier 12 and is positioned in the longitudinally center portion of the tubular inflator housing 11. The longitudinally center portion of the tubular shaped housing 11 is reduced in diameter to provide a manifold area 13 and is covered by a gas distribution manifold 14 with exhaust ports 10. The reduction in diameter also serves to reduce stresses in the regions of the gas fill port 15 and the outlet burst disk assembly 16.

The need for adequate space is solved by placing heater assemblies 1, 2 at both ends 30 of the inflator 100 and the outlet burst disk assembly 16 and the fill port 15 in the sidewall near the center of the tubular inflator housing 11. The problem of achieving acceptable time to begin providing gas to an airbag is solved through the use of a high bypass heater assembly having a larger than typical quantity of an ignition enhancer composition 25. The ignition enhancer composition 25 burns quickly, in one to three milliseconds. Hot gases and particulates produced by the burning ignition enhancer composition 25 are directed to the gas generant 27 and a portion of the hot gases produced by the burning ignition enhancer composition 25 goes into the gas storage bottle or housing 11 through the bypass openings 24, and in this way the hot gases and particulates produced by burning the ignition enhancer composition both heats the stored gas 6 to increase the pressure to the outlet burst disk 7 and also ignites the gas generant 27. The arrangement avoids the problem of over igniting the gas generant 27 by bypassing a portion of the larger than usual quantity of ignition enhancer composition 25 while allowing a portion of the hot gases produced by the burning ignition enhancer composition 25 to pass directly through the heater to ignite the gas generant 27.

As shown in FIG. 1 the hybrid inflator 100 has two heater assemblies 1, 2, each assembly can employ the bypass enhancer system or alternatively one heater assembly may employ a high bypass system and the other may be a more conventional heater mechanism not employing the bypass system. The hybrid inflator 100 can be made with a single heater element heater assembly 1, in such a case the tubular inflator housing 11 may be shortened substantially or the heater assembly 1 can be elongated in such a fashion to increase the amount of ignition enhancer composition 25 and gas generant 27 available for the purposes of pre-heating and heating the inert gases 6 within the hybrid inflator 100.

Figure 2:
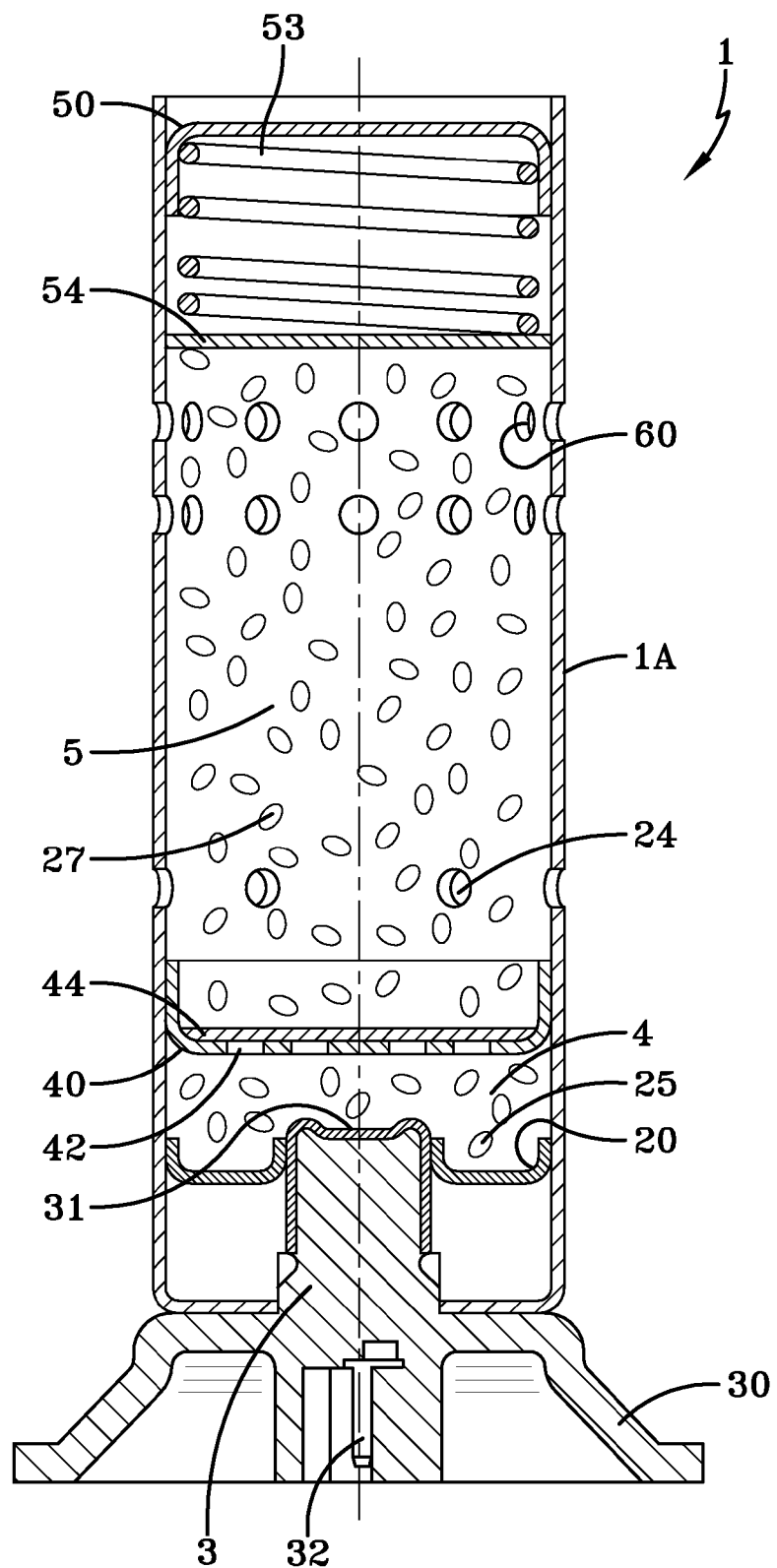
FIG. 2 is an enlarged cross section of a heater from the hybrid airbag inflator shown in FIG. 1 that may be employed in a hybrid airbag inflator according to the present invention.
Figure 3:
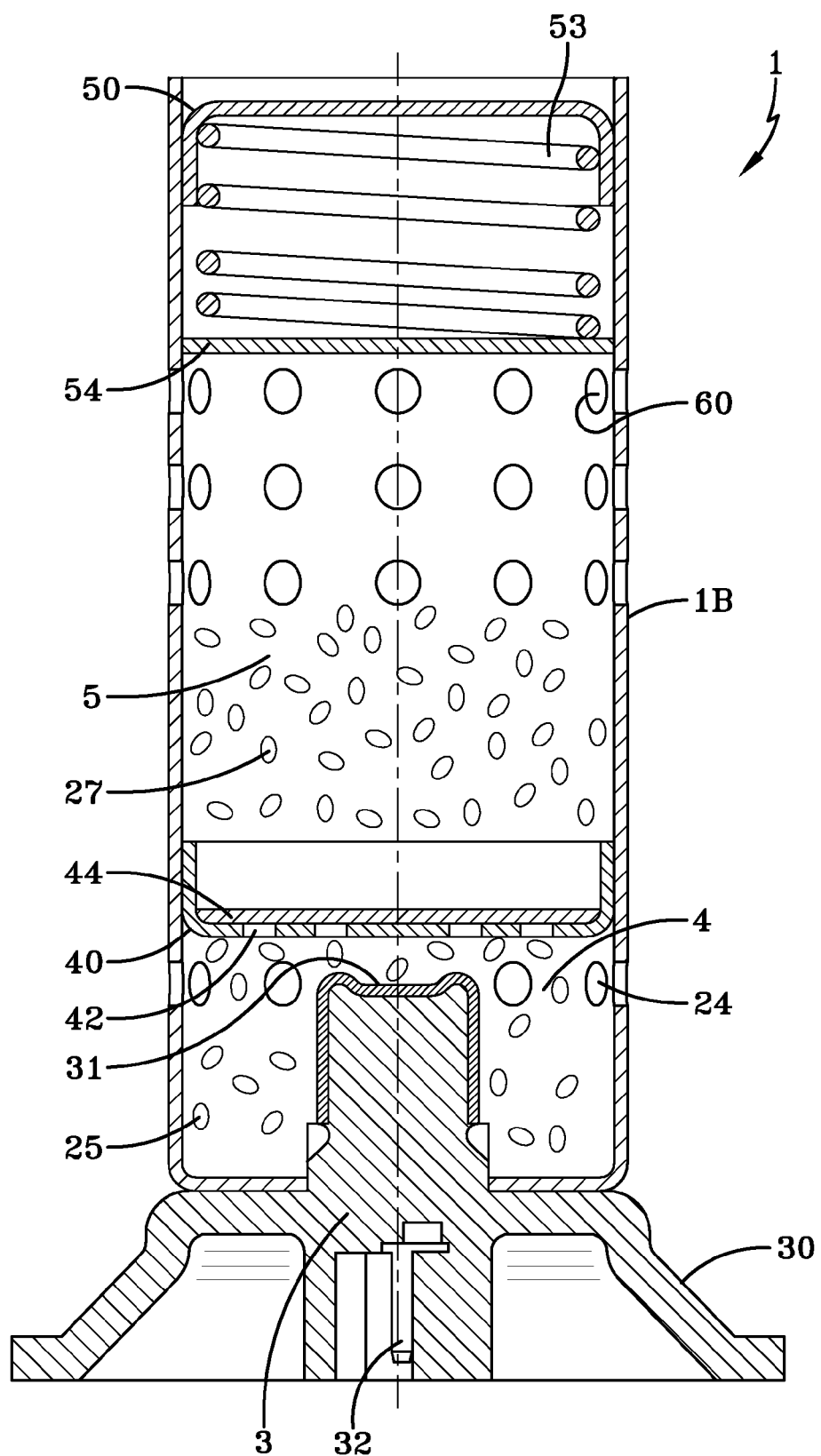
FIG. 3 is an enlarged cross section of a heater according to a second embodiment that may be employed in a hybrid airbag inflator according to the present invention.
Figure 4:
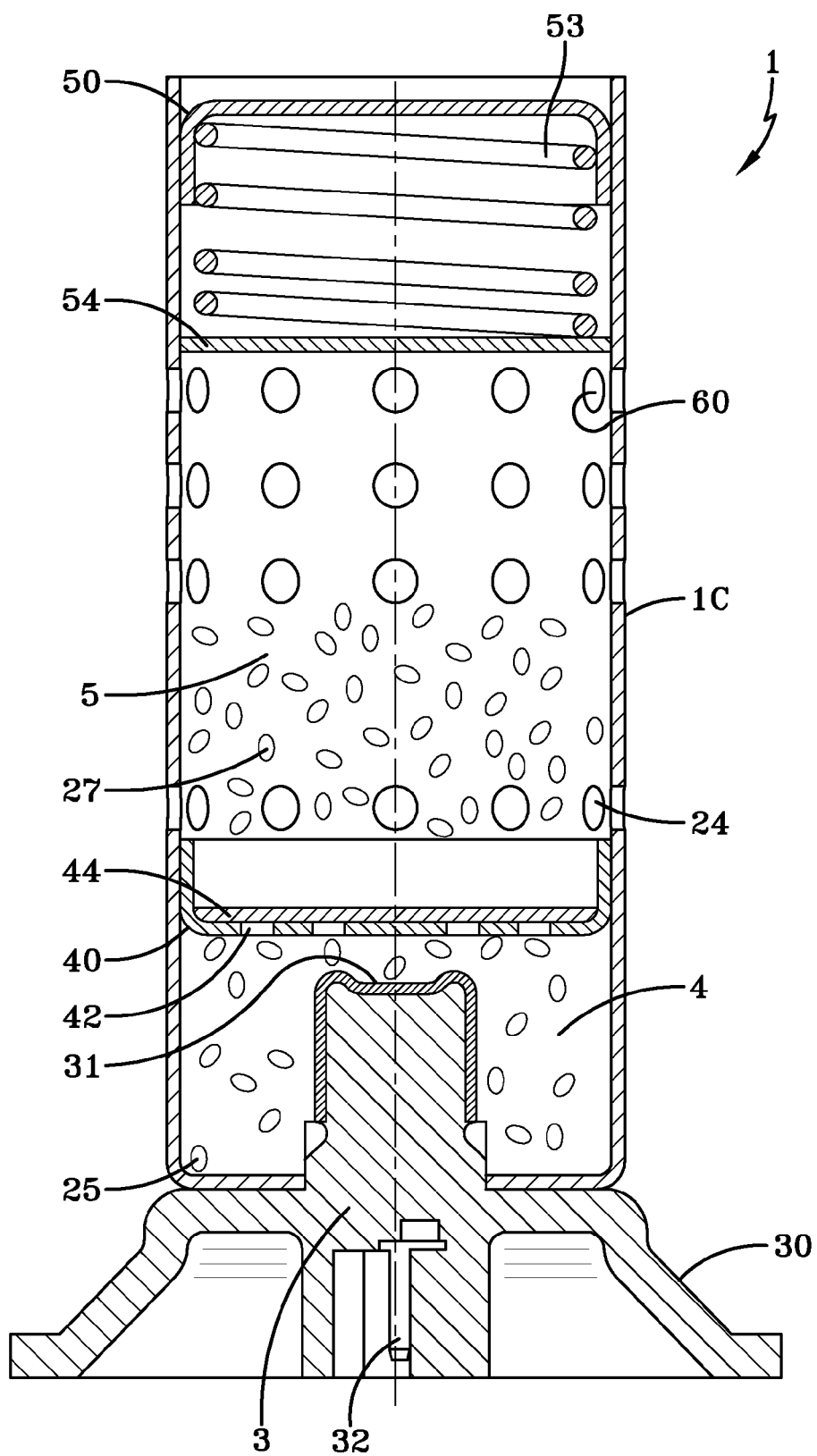
FIG. 4 is an enlarged cross section of a heater according to a third embodiment that may be employed in a hybrid airbag inflator according to the present invention.

The following provides a description of several heater assemblies employing the enhancer bypass system according to the present invention. Each of FIGS. 2, 3 and 4 shows a different heater assembly that can be employed within the tubular inflator housing 11 illustrated in FIG. 1. It must be understood that the reference numerals for similar components remain similar and those of alternative or substitute components are provided with distinct reference numerals. For ease of understanding the invention the gas generant 27 and the ignition enhancer composition 25 are not shown in entirety, but are represented by a few pellets. The ignition enhancing composition and the gas generant are generally formed in either a disk type material that can fit within the generant tube or more preferably in pellets. The pellets are sufficiently large to prevent them from passing through any of the openings 24, 60 within the heater assembly. As illustrated the heater assembly is shown such that in each of the areas where a particular charge is shown the charge area or volume is a chamber, these chambers it can be assumed are filled or at least partially filled with the pyrotechnic components described herein. One of ordinary skill in the art will appreciate the manner in which pyrotechnic compositions are placed in such heater assemblies; however, they are not completely shown so that the functioning components of the structure of the inflator can be more easily shown.

With reference to FIG. 2, a first heater assembly 1 is illustrated in a cross sectional view. The heater assembly 1 has a generant tube 1A that is physically connected to an end cap 30 of the tubular inflator housing 11. Located within the end cap 30 is an igniter 3. The igniter 3 is electrically connected at the opening 32 such that the igniter 3 can be activated allowing a small explosive charge to burst an enclosure 31 allowing the explosive charge to ignite the ignition enhancer composition 25 contained within the enhancer combustion chamber 4. Once the ignition enhancer composition 25 within the enhancer combustion chamber 4 is ignited the burning ignition enhancer composition produces hot gases and particulates that enter into the gas generant combustion chamber 5. A portion of the hot gases and particulates bypass the gas generant 27 in the gas generant combustion chamber 5 and pass through openings 24 which enables a portion of the hot gases and particulates produced by burning ignition enhancer composition to pass directly into the inert gas storage chamber and pre-heat the inert gas 6. As shown, hot gases and particulates from the enhancer combustion chamber 4 pass through one or more communication ports or first openings 42 thereby igniting the gas generant 27. A portion of the gases from the enhancer combustion chamber 4 are burning in such a fashion that they are generating a pressure. Once the pressure is sufficiently large a barrier foil 44 shown adjacent to the bulkhead 40 is burst. When the barrier foil 44 bursts, the one or more first openings 42 in the bulkhead 40 are exposed into the gas generant combustion chamber 5. As these hot gases and particulates enter into the gas generant combustion chamber 5 a portion bypasses through openings 24 and then the pellets of gas generant 27 are ignited shortly thereafter. As these pellets of gas generant 27 are ignited a portion of the heated gases and particulates from the gas generant combustion chamber 5 pass through the plurality of openings 60 in the gas generant tube to facilitate heating of the inert gas 6 as well.

As shown when the charges of ignition enhancer composition 25 and gas generant 27 are first assembled into the housing unit the end closures retain the ignition enhancer composition 25 such that the enhancer combustion chamber 4 is positioned by the enhancer spacing bulkhead 20 that separates the empty end chamber 8 from the ignition enhancer composition filled ignition enhancer combustion chamber 4. This effectively locates the ignition enhancer composition 25 in close proximity to the igniter 3, the gas generant 27 and bulkhead 40. Once the enhancer combustion chamber 4 has been filled the bulkhead 40 and the barrier foil 44 separating the enhancer combustion chamber 4 from the gas generant combustion chamber 5 is inserted as shown. Then the gas generant pellets 27 can be loaded into the heater assembly 1. The end cap 50 is then pushed into the end of the generant tube 1 compressing a spring 53 and a pellet retaining plate 54 in close contact with the pellets of gas generant 27.

With reference to FIG. 3, an alternative heater assembly is shown wherein a second heater assembly 1 having the generant tube 1B is illustrated. In this embodiment the enhancer combustion chamber 4 is a single enhancer combustion chamber 4 having a plurality of bypass openings 24. The enhancer combustion chamber 4 is contains an ignition enhancer composition 25. When the igniter 3 is activated an enclosure 31 bursts such that the ignition enhancer composition 25 is ignited. As the ignition enhancer composition 25 burns hot gases and particulates are released through the bypass openings 24 and pre-heat the inert gas 6. As the pressure rises the burst foil 44, which is rupturable member, at the bulkhead 40 ruptures. As the seal is opened hot gases and particulates pass through the one or more first openings 42 and pass into the gas generant combustion chamber 5 heating the gas generant 27 such that gas generant ignites. As the gas generant ignites portions of the hot gases and particulates produced by burning the gas generant 27 pass through a plurality of openings 60. As shown the openings 60 are provided around the peripheral surface of the generant tube 1B and as shown the openings 60 are provided in three to five rows. These openings 60 permit the hot gases and particulates to escape or at least partially escape also pre-heating the inert gas 6. When a sufficient pressure is reached to permit the rupture disk 7, which is rupturable member, shown in FIG. 1 to burst in such a fashion that the hot gases can escape thereby filling the airbag for deployment. Optionally the enhancer combustion chamber 4 of the alternative embodiment can also include an enhancer spacing bulkhead 20 (FIG. 1) if so desired.

With reference to FIG. 4, a third embodiment of a heater assembly is shown. This embodiment is very similar to the first embodiment and the heater assembly 1 has a generant tube 1C that also contains a gas generant combustion chamber 5 for containing the gas generant 27 and an enhancer combustion chamber 4 for holding an ignition enhancer composition 25. Again when the igniter 3 is activated the enclosure 31 ruptures and a hot charge ignites the ignition enhancer composition 25. As the pressure from the hot gases produced by the burning ignition enhancer composition rises a barrier foil 44, which is a rupturable member, attached to the bulkhead 40 bursts allowing the hot gases and particulates to pass through the one or more first openings 42. As these hot gases pass through the one or more first openings 42 they are permitted to pass through the plurality of openings 24 in close proximity to and adjacent to the bulkhead 40. These bypass openings 24 permit a portion of the hot gases and particulates to pass into the inert gas 6 and pre-heat the inert gas 6. As the remaining portion of the hot gases and particulates produced by burning the ignition enhancer composition 25 pass through the generant pellets 27 while an initial portion of the hot gases and particulates pass through the bypass openings 24, the remaining portion continues to push into the gas generant combustion chamber 5 thereby igniting the gas generant 27. As the gas generant 27 is ignited all or large portions of the hot gases and particulates that are produced are permitted to pass through the openings 60 as shown; enabling the inflator to reach full pressure prior to rupturing the burst disk 7, which is a rupturable member, and allowing the airbag to deploy. Unlike the first embodiment of FIGS. 1 and 2, this third embodiment does not have an enhancer spacing bulkhead 20 and thus the entire enhancer combustion chamber 4 is available to hold the ignition enhancer composition 25.

As shown in FIGS. 1, 2 and 4, the openings 24 are sufficiently large and in close enough proximity to permit the hot gases and particulates produced by burning the ignition enhancer composition 25 to pass through them while a remaining portion of the hot gases and particulates produced by burning the ignition enhancer composition 25 are used to ignite the gas generant 27. This can be accomplished by first providing the row of openings 24 in very close proximity to the one or more first openings 42 in the bulkhead 40 and sufficiently spacing them from the openings 60 in the generant tube 1C such that a sufficient amount of hot gases and particulates are free to bypass through the first row of openings 24 prior to a remaining portion moving through the gas generant combustion chamber 5 igniting the gas generant 27. As the gas generant 27 is ignited the other openings 60 in the gas generant tube come into play, allowing some of those hot gases and particulates if not all to expel into the inert gas 6 also providing a form of pre-heating prior permitting the hot gases to expel from the openings 60 and 24 during the entire process.

The heater assemblies shown in FIGS. 2, 3 and 4 provide an efficient means to permit a portion of the hot gases and particulates produced by burning the ignition enhancer composition to bypass and pre-heat the inert gas 6. Each of the systems is activated by a single igniter 3. This has the benefits of both simplifying the heater assembly 1, 2 and the mechanisms, but also simplifying the ignition process such that it is more reliable.

In each of the heater assemblies illustrated it should be noted that the openings 24 in either the enhancer combustion chamber 4 or the gas generant combustion chamber 5, in other words openings 24 and 60 are in direct communication with the inert gas 6. Accordingly the inert gas 6 can pass through and is in direct communication with either the ignition enhancer composition 25 and the gas generant 27 as shown in FIG. 3 or the gas generant 27 in all the heater assemblies 1. In FIGS. 1, 2 and 4 using the generant tube 1A, 1C the ignition enhancer composition 25 is not in direct communication with the inert gas 6 as illustrated.

To summarize, the hybrid airbag inflator 100 shown in FIGS. 1 and 2 has a tubular inflator housing 11 filled with pressurized inert gas 6 and one or more heaters 1, 2 internal and connected at an end of the tubular inflator housing 11. At least one of the gas heaters 1, 2 has an outer shell formed by the generant tube having a plurality of holes 60 therethrough, and a gas generant combustion chamber 5 in which a gas generant 27 is stored. The gas generant combustion chamber 5 and the inert gas storage chamber 11 being in communication with each other through the plurality of holes 60 in the gas generant tube. An igniter 3 is connected to the gas heater 3 and located at an end of the tubular inflator housing 11. An enhancer combustion chamber 4 contains an ignition enhancer composition. The enhancer combustion chamber 4 is located between the gas generant combustion chamber 5 and the igniter 3 and is separated from the gas generant combustion chamber 5 by a bulkhead 40. The bulkhead 40 has one or more first openings 42 leading to the gas generant combustion chamber 5.

In the first embodiment of a heater assembly that may be used in the airbag inflator of the present invention, an enhancer spacing bulkhead 20 is employed dividing the enhancer combustion chamber 4 into a first chamber portion 4 of a volume or size appropriate for the ignition enhancer composition 25 and a second empty chamber portion 8 occupying the end space. This bulkhead 20 is somewhat washer shaped and encircles the igniter 3.

An alternative second embodiment shown in FIG. 3 of a heater assembly that may be used in the airbag inflator of the present invention has a single enhancer combustion chamber 4 in which an ignition enhancer composition 25 is stored. In this embodiment, when the ignition enhancer composition 25 is ignited by an igniter 3 it produces hot gases and particulates that pass through a plurality of enhancer combustion chamber bypass openings 24 directly to the inert gas storage chamber 11 thereby pre-heating the inert gas 6 in the inert gas storage chamber 11 and the enhancer combustion chamber 4 passes gases through the one or more first openings 42 in the bulkhead 40 and ignites the gas generant 27.

In the third embodiment shown in FIG. 4 of a heater assembly that may be used in the airbag inflator of the present invention, the ignition enhancer composition 25 is stored in a single enhancer combustion chamber 4 that when ignited produces hot gases and particulates that pass through the bulkheads 40 one or more first openings 42 and in close proximity to the bulkhead 40 are a plurality of bypass openings 24 that permit a portion of the hot gases and particulates produced by the burning ignition enhancing composition to escape directly into the inert gas chamber 6 in the inert gas storage chamber 11 thereby pre-heating the inert gas 6 while the remaining portion of the hot gases and particulates produced by the burning ignition enhancing composition continues into the gas generant combustion chamber 5 to ignite the gas generant 27. In each case only a single igniter 3 is connected to each gas heater and is used to start the entire gas generating and gas heating process as described above.

Figure 5:
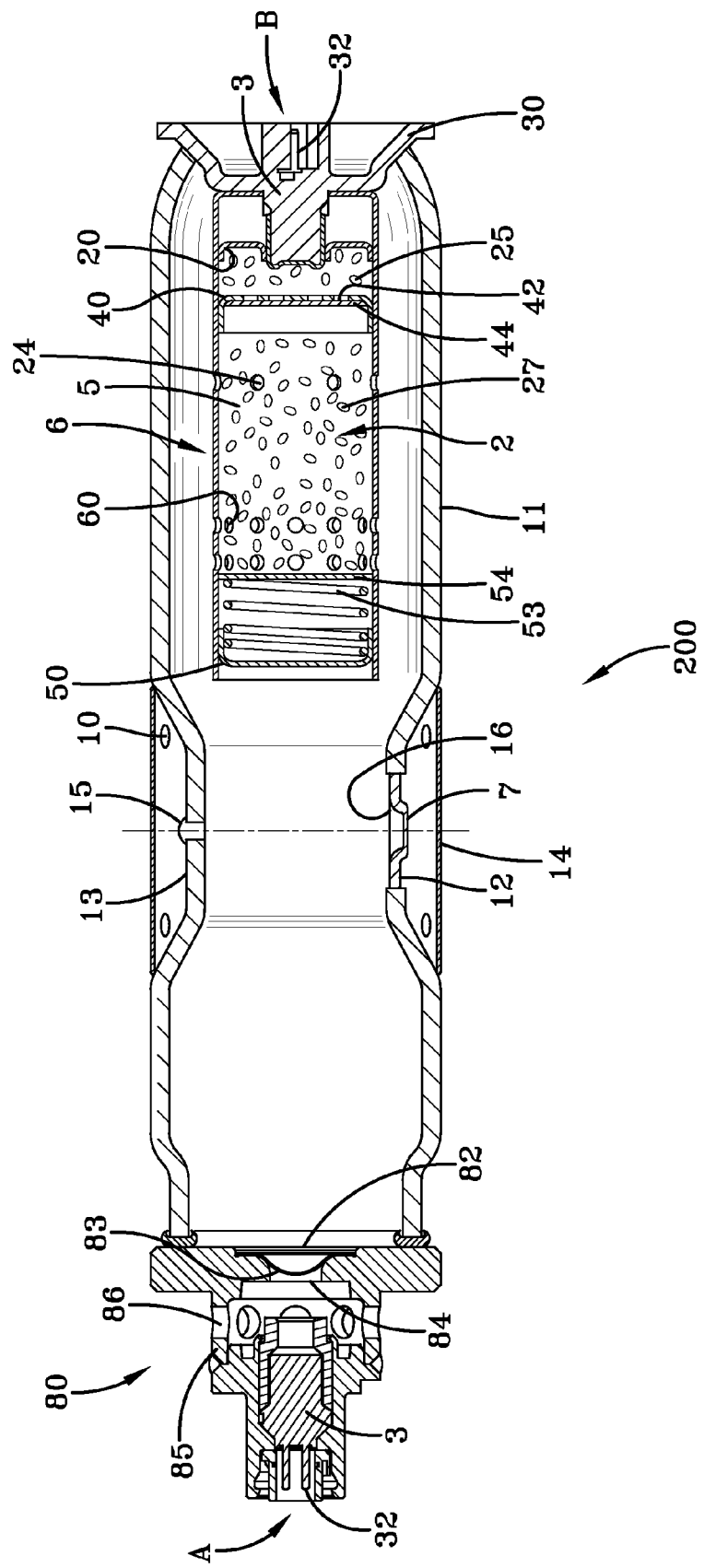
FIG. 5 is a longitudinal cross section of a hybrid airbag inflator according to the present invention having a gas heater located at one end of the tubular inflator housing and a gas release mechanism located at the other end of the tubular inflator housing.
Figure 6:
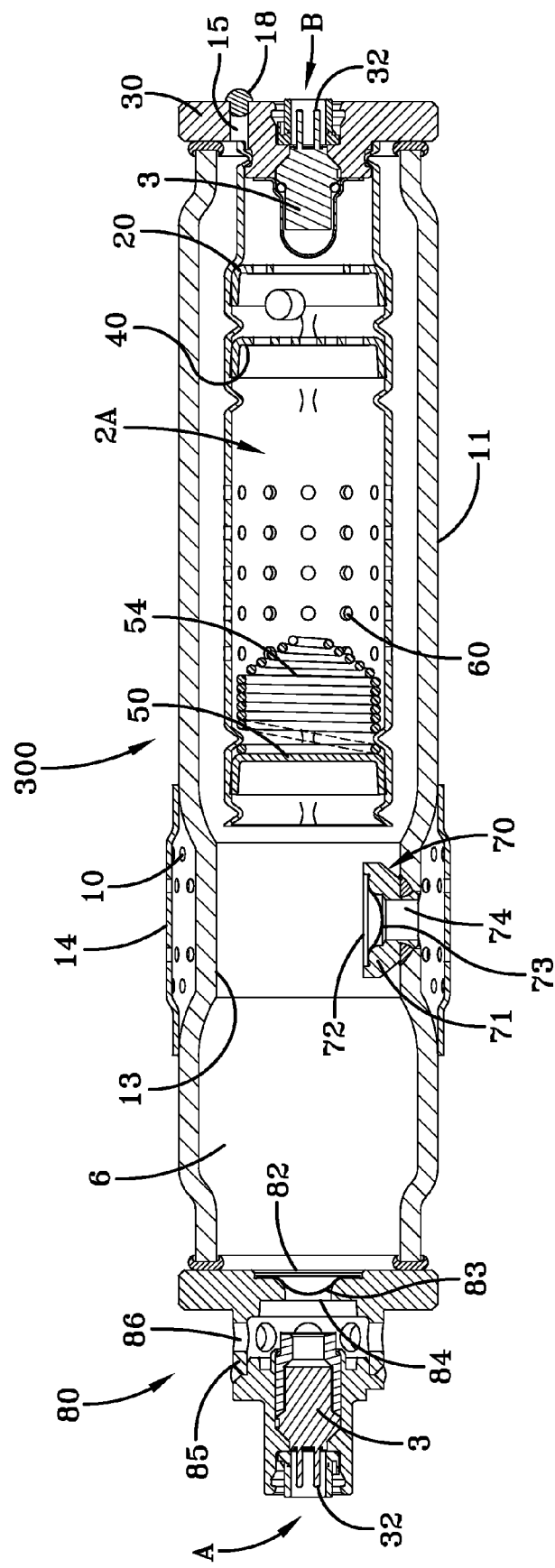
FIG. 6 is a longitudinal cross section of a second hybrid airbag inflator according to the present invention having a gas heater located at one end of the tubular inflator housing and a gas release mechanism located at the other end of the tubular inflator housing.

With reference to FIGS. 5 and 6 longitudinal cross sectional views of inflators 200, 300 according to the present invention are shown. Each inflator is provided with a unique gas release mechanism 80.

The hybrid airbag inflator 200 of FIG. 5 includes the components previously discussed with respect to FIG. 1. However the tubular inflator housing 11 has two ends A, B with one heater assembly 2 attached at one end B. At the opposite end A of the inflator, there is no second heater assembly heater, but rather a gas release mechanism 80 is welded or otherwise securely attached to the tubular inflator housing 11 as shown.

With reference to FIG. 6 a similar hybrid airbag inflator 300 is shown having a single heater assembly 2A attached at end B of the tubular inflator housing 11. As shown the heater assembly 2A is attached to an end cap 30 that is welded or otherwise securely attached to the tubular inflator housing 11. The end cap 30 has a fill port opening 15 to provide an access to charge the inflator with inert gas 6 under pressure. The inflator fill port opening 15 is then sealed with a metal or solid type plug 18. While the heater assembly 2A is slightly different than that shown in FIG. 5 its function is to ignite the propellant charge and also heat the inert gas 6 when a signal is electrically passed to the connectors at opening 32 which activates the igniter 3. Once the gas pressure inside the tubular inflator housing exceeds a predetermined value $P_{Burst}$, a sealing means having at least one rupturable member, such as a burst disk 72 preferably used in combination with a concave seal 73 contained on the primary airbag vent port assembly 70 ruptures and the inflation gasses are vented directly into the airbag to inflate it. As shown the primary vent port assembly 70 is welded or otherwise affixed to the tubular inflator housing 11 and spaced apart from and between the ends A, B of the tubular inflator housing. The vent port assembly 70 has a round washer shaped body 71 with a hole 74 passing through the body 74 and the tubular inflator housing 11. As the gas exits the inflator it travels under the manifold 14 from the reduced diameter section 13 and through the small openings 10 to fill the airbag.

In the event a vehicle occupant is out of position and the airbag deployment needs to be terminated or slowed, a signal can be electronically sent to the gas release mechanism 80 to activate a means for opening, such as a pyrotechnic device 3 like an igniter, for opening a rupturable member 82, 83 sealing the gas release mechanism 80.

The gas release mechanism 80 has an electrical connector 32 that can activate an igniter 3 to provide the means 3 to open the gas release mechanism 80 that includes a passageway or opening 84 that is sealed by a rupturable member 82, 83 including a seal 83 and one or more rupture disks 82. The igniter 3 ruptures the seal 83 and blows the one or more rupture disks 82 into the chamber inside the tubular inflator housing. These rupture disks 82 are shown as a stacked pair and during normal activation of the inflator 200 can withstand a substantially greater pressure than the $P_{Burst}$ pressure of the ruptured disk 72 and seal 73 in the airbag vent port 70. In normal use the gas release mechanism 80 is sealed. However, when it is desired to terminate or rapidly slow airbag deployment the activation of the igniter 3 will open the sealed and blocked passageway or opening 84. Once open the inflation gasses will move through the passageway or opening 84 and exit an exhaust port end or housing 85 through a plurality of radially oriented exhaust openings 86. The exhaust openings 86 are preferably oriented in a radially opposing fashion to create a thrust neutral exhausting of the gasses. In this way no severe loading of the inflator 200, 300 or its attachment to a module housing is at risk.

Preferably the exhaust openings 86 and the passageway 84 are larger in area than the opening 74 of the vent port assembly and downstream openings 10 in the manifold 14 such that the pressurized gasses primarily are exhausted directly from the inflator 200, 300 rather than filling the airbag. Unlike prior art methods and devices used to terminate airbag deployment the present invention effectively uses the inflator to provide a direct and pressured release of the inflation gasses to ambient air. Accordingly the speed of gas venting is assisted by the pressure contained in the inflator at the onset and as the gas tries to escape under this pressure it moves through the exhaust port gas release mechanism 80 as a path of least flow resistance. This insures the inflation gasses are diverted from filling the airbag and effectively terminates full deployment in a reliable extremely fast way.

Figure 7:
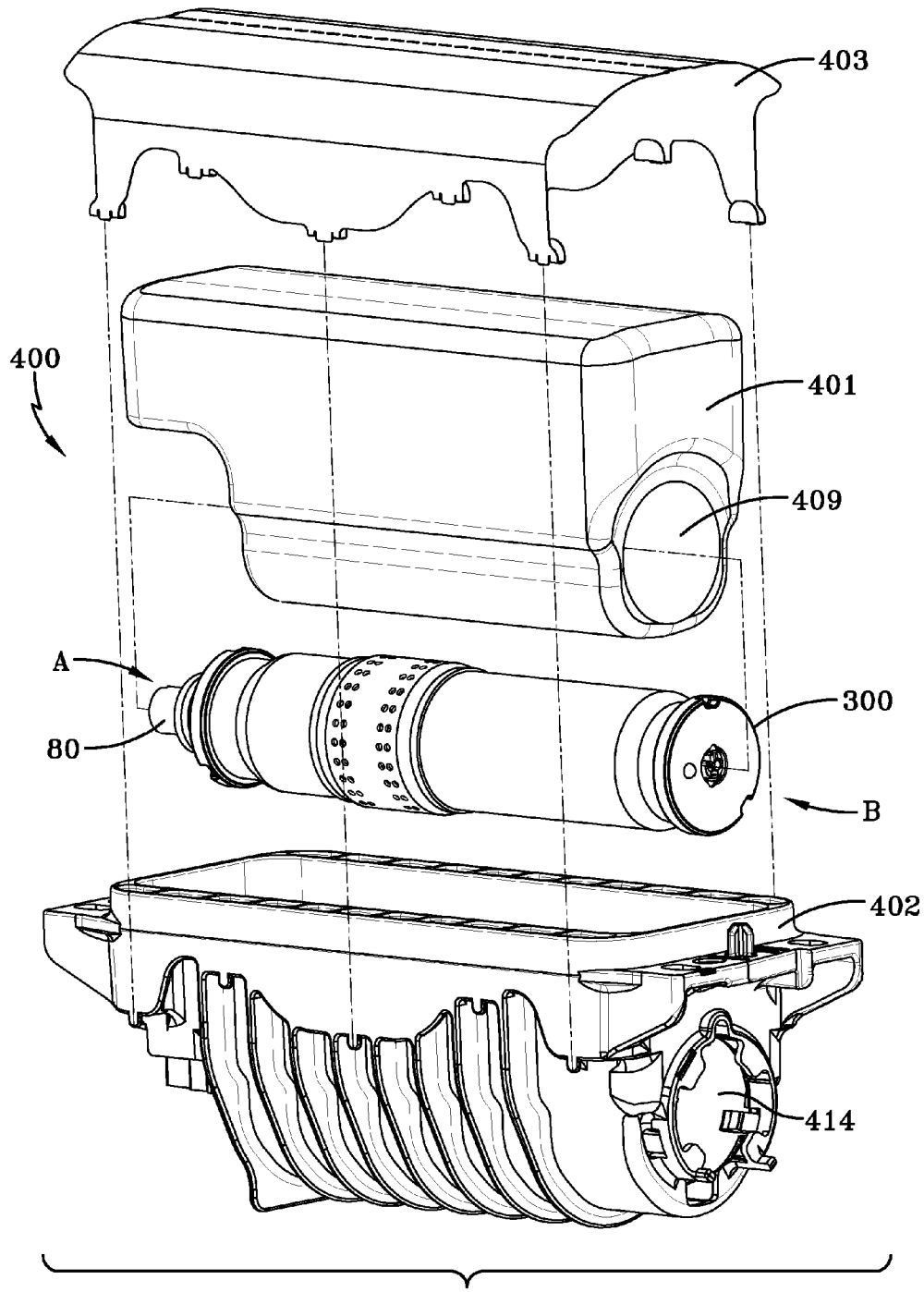
FIG. 7 is a perspective exploded view of the elements comprising an airbag module having an airbag inflator according to the present invention.

With reference to FIGS. 7 through 11 an airbag module assembly 400 having an airbag inflator according to the present invention is shown. With reference to FIG. 7 the module assembly 400 has a module housing 402, an airbag inflator 300, an airbag 401 and a cover 403 as shown.

Figure 8:
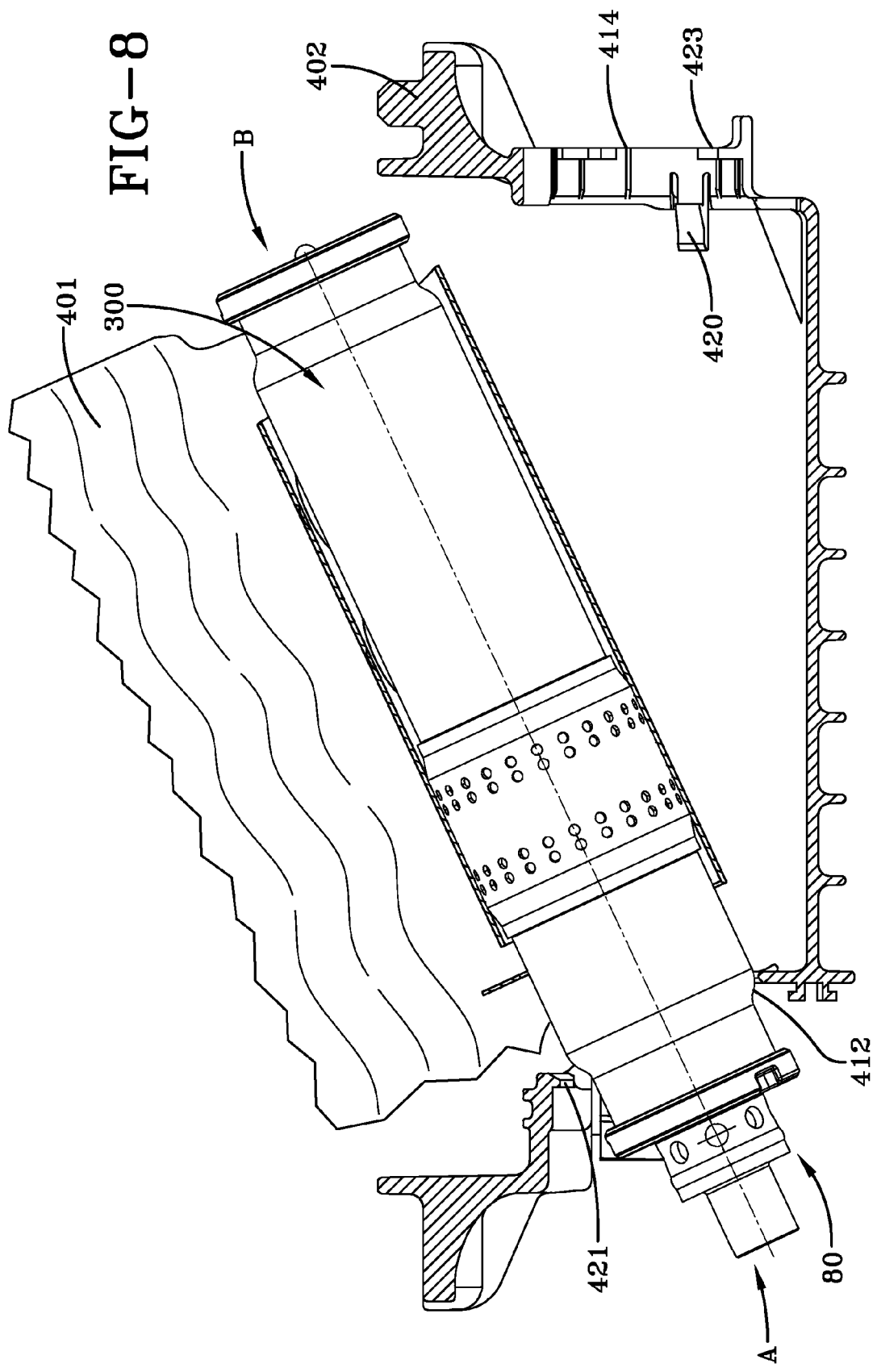
FIG. 8 is a longitudinal cross section of an airbag module according to the present invention having a hybrid airbag inflator like that shown in FIG. 6 being assembled into the module housing.
Figure 9:
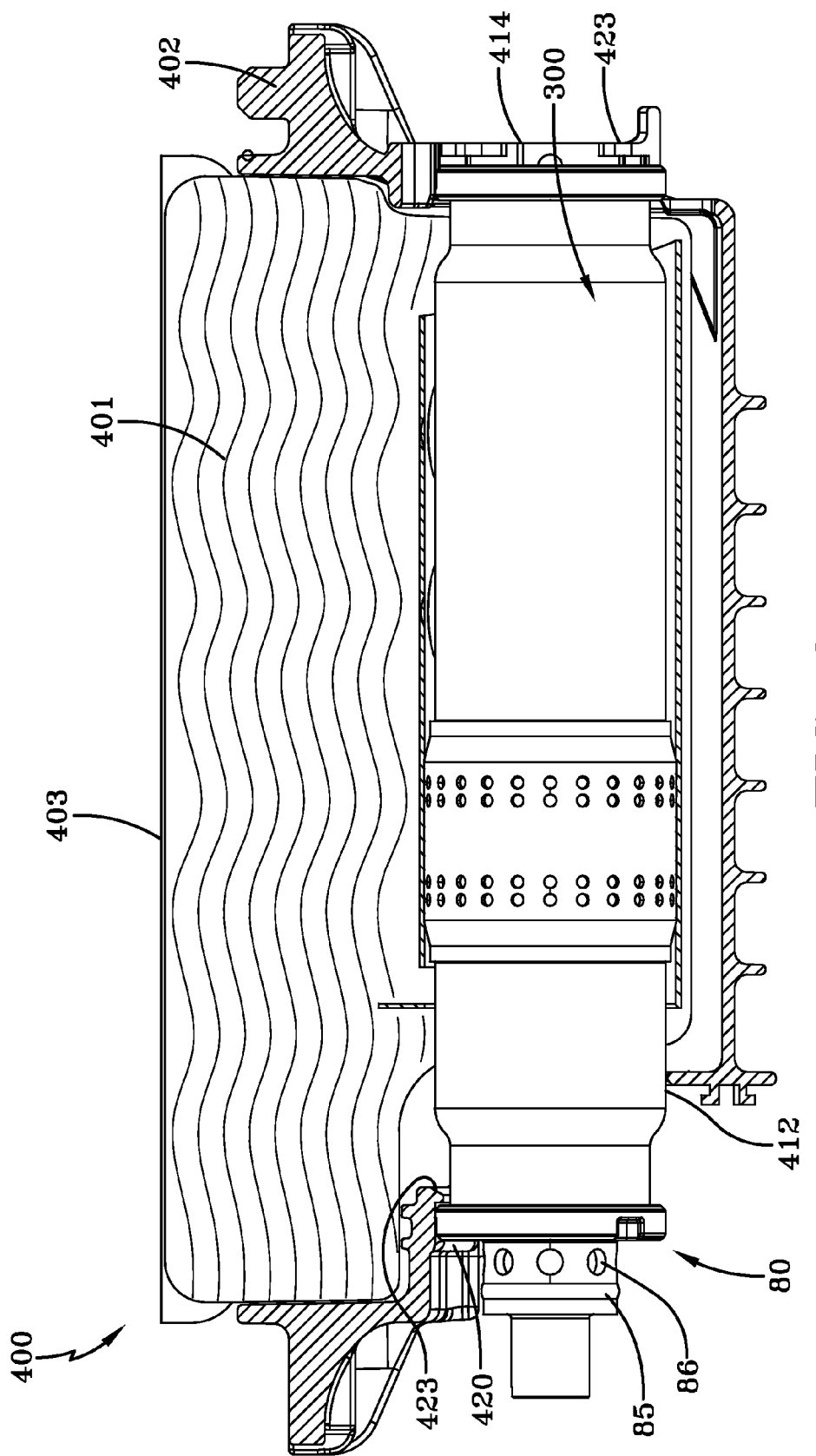
FIG. 9 is a longitudinal cross section of the assembled airbag module.
Figure 10:
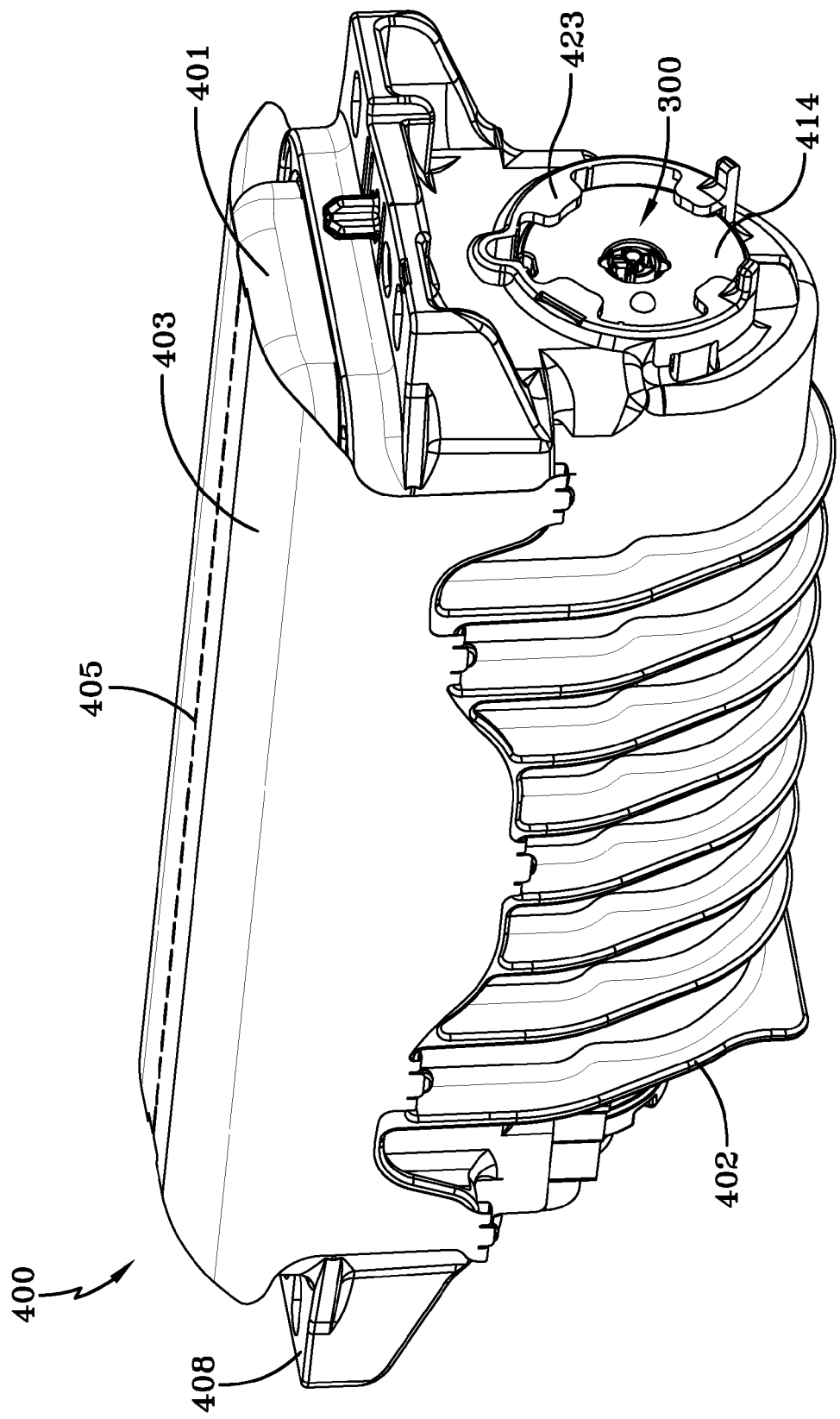
FIG. 10 is a perspective view of the airbag module.

The module housing 402 as illustrated is a molded plastic component wherein the inflator 300 is placed in the module housing with both ends A, B of the inflator secured and exposed for attaching electrical wiring through openings 412, 414 in the module housing. As shown in FIG. 8 when assembled the inflator 300 is inserted in a tubular opening 409 in the airbag 401 with both ends A, B of the inflator exposed. The first end A of the inflator with the gas release mechanism 80 is placed through an opening 412 in the module housing and then the second end B of the inflator is lowered into alignment with the opening 414 and pushed into position as shown in FIG. 9. The flanged ends of the inflator 300 are snapped into a hold position by clips 420, 421 and projecting stops 423. Once the inflator is secured the remainder of the unfolded airbag 401 is tucked into the module housing 402 and the outer cover 403 is attached to the module housing 402 to form a completed module assembly 400 as shown in FIG. 10. The outer cover 403 is preferably a synthetic material like Tyvek® that has a perforated tear line 405 such that upon airbag deployment the inflating airbag or cushion 401 pushes against and easily tears the cover 403 along tear line 405 as it projects outwardly.

Figure 11:
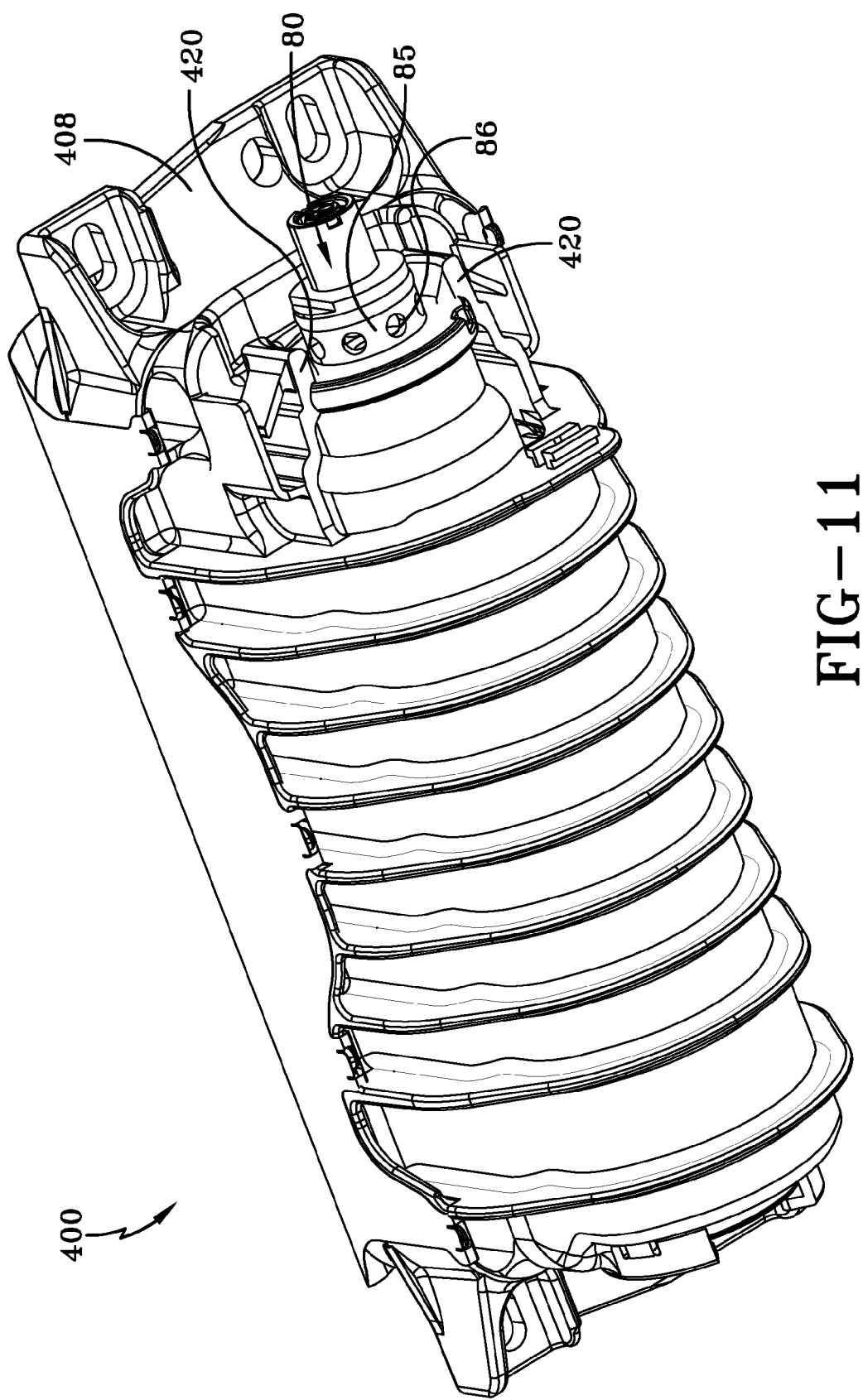
FIG. 11 is a perspective view of the airbag module looking towards the underside of the housing showing the external gas exhaust port of the gas release mechanism.

With reference to FIGS. 9 and 11 the airbag module assembly 400 when formed as described has that portion of the gas release mechanism 80 which includes the exhaust port end or housing 85 and exhaust port vent openings 86 located external of the module housing 402 such that gas can be vented and bypass the airbag. As shown an upper mounting portion 408 of the module housing 402 overhangs the end of the inflator 300 above the gas release mechanism 80. Nevertheless in the event of actuating the gas release mechanism 80 the escaping gasses would be directly exhausted external of the housing 402 directly from the inflator 300. Accordingly no secondary doors, panels or flaps would need to be opened prior to or during an airbag deployment limitation or termination when using the gas release mechanism 80 as it is already positioned with the exhaust port end or housing 85 with exhaust port vent openings 86 external of the housing 402.

The present invention as shown can use either of the airbag inflators 200, 300 with the gas release mechanism 80 disclosed herein. Alternatively inflators of a non inert gas filled type such as a pyrotechnic only type airbag inflator or a stored gas only airbag inflator or any other type inflator could be used with the gas release mechanism 80 as shown and described as long as the exhaust port vent openings 86 are open or otherwise external of the housing upon assembly.

Furthermore as used herein it is understood that the term external of the housing means the exhaust openings 86 are not internal of that portion of the housing holding the airbag 401 and that the exhaust vent openings 86 have an open pathway external of the inside of the housing 402, but directly in open communication with the inflation gasses contained or otherwise generated within the housing 11 of the inflator.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. An airbag inflator comprising:
    a tubular inflator housing having a longitudinally extending tubular center portion positioned between a first end and a second end of the tubular inflator housing;
    a primary gas vent port located on the tubular center portion that is spaced apart from both ends of the tubular inflator housing for venting gas from the tubular inflator housing into an airbag;
    a gas release mechanism having an exhaust port at the first end of the tubular inflator housing for releasing gas directly from the tubular inflator housing to ambient air, thus bypassing the airbag; and
    a gas flow manifold encircling the tubular inflator housing and primary vent port in a depression or reduced diameter portion of the tubular inflator housing, wherein the manifold has a plurality of radially oriented openings for passing the gas into the airbag.

2. The airbag inflator of claim 1 further comprising a heater assembly containing a gas generant located and attached at the second end of the tubular inflator housing, and a means for activating the heater assembly.

3. The airbag inflator of claim 2 further comprising inert gas contained in the tubular inflator housing.

4. The airbag inflator of claim 2 wherein the means for activating the heater assembly is an igniter.

5. The airbag inflator of claim 1 wherein the gas release mechanism further comprises:
    a passageway or opening for exhausting gas from the tubular inflator housing to the exhaust port;
    a means for sealing the passageway or opening of the gas release mechanism; and
    a means for opening the means for sealing.

6. The airbag inflator of claim 5 wherein the means for sealing the gas release mechanism includes one or more rupturable members.

7. The airbag inflator of claim 6 wherein the means for opening includes an igniter for rupturing the one or more rupturable members.

8. The airbag inflator of claim 6 wherein the primary gas vent port is sealed by a vent port sealing means that includes at least one rupturable member that will rupture or burst when subjected to a predetermined pressure.

9. The airbag inflator of claim 8 wherein the rupturable member of the gas release mechanism will rupture or burst when subjected to a predetermined pressure that is greater than the predetermined pressure at which the rupturable member of the primary gas vent port sealing means will rupture.

10. The airbag inflator of claim 1 wherein the exhaust port has one or more vent openings.

11. An airbag inflator of claim 10 wherein the exhaust port has a plurality of vent openings radially oriented to provide thrust neutral exhaust.

12. The airbag inflator of claim 1 wherein the primary gas vent port is sealed by a vent port sealing means that includes at least one rupturable member that will rupture or burst when subjected to a predetermined pressure.

13. An airbag inflator comprising:
    a tubular inflator housing having a longitudinally tubular center portion positioned between a first end and a second end of the tubular inflator housing;
    a primary gas vent port located on the tubular center portion that is spaced apart from both ends of the tubular inflator housing for venting gas from the tubular inflator housing into an airbag, the primary gas port being sealed by a rupturable member that will rupture or burst when subjected to a predetermined pressure provided by gas inside the tubular inflator housing;

a gas release mechanism having a passageway or opening at the first end of the tubular inflator housing, the passageway or opening being sealed by a rupturable member that will rupture or burst when subjected to a predetermined pressure that is greater than the predetermined pressure at which the rupturable member of the primary gas vent port sealing means will rupture, the rupturable member of the gas release mechanism being rupturable by a pyrotechnic device for releasing gas directly from the tubular inflator housing to ambient air thus bypassing the airbag; and a gas flow manifold encircling the tubular inflator housing and primary vent port in a depression or reduced diameter portion of the tubular inflator housing.

14. The airbag inflator of claim 13 further comprising:

a heater assembly containing a gas generant located and attached at the second end of the tubular inflator housing; and inert gas contained in the tubular inflator housing.

15. The airbag inflator of claim 13 wherein the exhaust port has one or more vent openings.

16. A hybrid airbag inflator comprising:

a tubular inflator housing having a longitudinally tubular center portion positioned between a first end and a second end of the tubular inflator housing;

a heater assembly containing a gas generant located and attached at the second end of the tubular inflator housing;

inert gas contained in the tubular inflator housing;

a primary gas vent port on the tubular center portion that is spaced apart from both ends of the tubular inflator housing for venting gas from the tubular inflator housing into an airbag, the primary gas port being sealed by a rupturable member that will rupture or burst when subjected to a predetermined pressure provided by gas inside the tubular inflator housing; and a gas release mechanism having an exhaust port at the first end of the tubular inflator housing, the exhaust port being sealed by a rupturable member that will rupture or burst when subjected to a predetermined pressure that is greater than the predetermined pressure at which the rupturable member of the primary gas vent port sealing means will rupture, the rupturable member of the gas release mechanism being rupturable by a pyrotechnic device for releasing gas directly from the tubular inflator housing to ambient air thus bypassing the airbag;

wherein the heater assembly comprises an outer shell formed by a generant tube having a plurality of holes therethrough; a gas generant combustion chamber in which the gas generant is stored, the gas generant combustion chamber and the tubular inflator housing being in communication with each other through the plurality of holes in the generant tube; an ignition means connected to the heater assembly and located at the second end of the tubular inflator housing; an enhancer combustion chamber in which an ignition enhancer composition is stored, the enhancer combustion chamber being located between the gas generant combustion chamber and the ignition means, and separated from the gas generant combustion chamber by a bulkhead, the bulkhead having one or more first openings therethrough; and wherein the ignition enhancer composition when ignited by the ignition means produces products of combustion that will both ignite the gas generant in the gas generant combustion chamber and heat the inert gas stored in the tubular inflator housing to achieve the predetermined pressure required to rupture the rupturable member sealing the primary gas vent port.

* * * * *